United States Patent [19]
Manning

[11] 3,903,413
[45] Sept. 2, 1975

[54] GLASS-FILLED POLYMERIC FILTER ELEMENT

[75] Inventor: Monis J. Manning, Lexington, Mass.

[73] Assignee: Polaroid Corporation, Cambridge, Mass.

[22] Filed: Dec. 6, 1973

[21] Appl. No.: 422,599

[52] U.S. Cl. ............... 250/226; 250/239; 350/311; 354/59
[51] Int. Cl. ............................................. G01j 3/34
[58] Field of Search ............ 250/226, 211 R, 211 J, 250/216, 239, 551; 350/109, 320, 126, 311; 264/DIG. 48; 354/59, 38

[56] References Cited
UNITED STATES PATENTS

| | | | |
|---|---|---|---|
| 2,912,592 | 11/1959 | Mayer | 250/211 R |
| 2,953,621 | 9/1960 | Schultz | 250/211 J |
| 3,114,045 | 12/1963 | Mash | 250/213 R |
| 3,125,684 | 3/1964 | Borgoyn et al. | 250/239 |
| 3,153,149 | 10/1964 | Finigian | 250/239 |
| 3,300,646 | 1/1967 | Casebeer | 250/216 X |
| 3,645,633 | 2/1972 | Kisatsky et al. | 250/226 X |
| 3,758,193 | 9/1973 | Tung | 350/109 X |

*Primary Examiner*—Walter Stolwein
*Attorney, Agent, or Firm*—Philip G. Kiely; Mart C. Matthews

[57] ABSTRACT

An optical filter element is provided which comprises a plastic resin containing a particulate dispersion of filter glass. In one preferred embodiment, the photocell of a photometric device, e.g., the automatic exposure control system of a photographic camera, is embedded in the glass-filled resinous element to provide necessary spectral correction filtration for the photocell.

13 Claims, 2 Drawing Figures

GLASS-FILLED POLYMERIC FILTER ELEMENT

BACKGROUND OF THE INVENTION

1. Field of the Invention

This invention relates to devices and processes for the filtration of electromagnetic radiation and, more particularly, to spectral filtration employing glass-filled polymeric filter elements.

2. Description of the Prior Art

The employment of filter glasses to attenuate radiant energy of various wavelengths emitted by a light source, either equally (neutral filters) or selectively in certain spectral regions (color filters) is quite well known in the optical arts. For example, since the spectral response of a photoelectric cell, i.e., a photovoltaic cell, photoconductive cell, photodiode, etc. (hereinafter generally referred to as a "photocell") is quite different from that of the human eye or photographic color film, spectral correction filters made of glass are commonly employed in association with the photocell in most devices measuring visual light, e.g., photometers, photographic exposure meters, densitometers, colorimeters, radiometers, and the like.

Accordingly, it is common practice to place a glass filter element or a combination of glass filter elements in the optical path before the photocell in order to "correct" the spectral response of the photocell. The terms "correct" or "correction" as used herein and in the appended claims denote the modification of the spectral composition of the radiant energy incident on the photocell so as to conform with a predetermined standard or referance, e.g., the sensitivity of the eye or photographic film. A detailed discussion of prior art glass filters for the correction of the spectral response of a photocell may be found in, for example, *J. Sci. Instrum.*, Vol. 27, pgs. 131–129 (1950) and Lange, B., *Photoelements*, Reinhold Publishing Corp., New York (1938).

Glass filters have heretofore taken the form of discrete elements comprising a stratum, or strata, of glass cut to the desired size and shape, and preferably polished at the air/glass interfaces to maximize their optical efficiency. Since glass is not a particularly versatile material to work with when compared to, for example, polymeric materials, manufacturing procedures involving glass filter elements are quite intricate, particularly regarding the cutting, shaping and optical finishing of the element. When these elements are very small, problems of handling, mounting, positioning, etc., are also added. The inability to salvage lower quality melts by blending them with higher quality melts, as is possible with glass in powdered form or with polymeric materials, is another serious drawback to the prior art use of filter glass in slab or sheet form.

The present invention is directed to providing a filter element having the desirable optical filtration characteristics of a glass filter as well as the physical versatility and convenience of a polymeric material, and to eliminating the above-described deficiencies of prior art filters made entirely of glass.

BRIEF SUMMARY OF THE INVENTION

In accordance with this invention, it has been found that an optical filter element comprising a plastic resin containing a particulate dispersion of filter glass provides an attenuation of radiant energy passing through it, i.e., provides optical filtration, comparable to that obtained by a discrete glass filter. In a typical fabrication of the filter elements of the present invention, the glass filter material may be first ground to particles of, for example, from about 1 to 10 microns in diameter, and then uniformly dispersed in a compatible plastic resin, for example, an epoxy resin having substantially the same refractive index as the filter glass, at the desired level, preferably from about 30% to about 60% by weight, to form a glass-filled resinous compound useful in forming a filter element of the appropriate size and shape.

In one embodiment of the invention, the subject filter element is employed to correct the spectral response of a photocell. Preferably, the photocell may be embedded in the above-mentioned filter glass-filled resin to provide an integral photocell/filter combination which can be easily handled and readily mounted on the circuitry of a photometric device, for example, the automatic exposure control assembly of a photographic camera. The manufacture of such photometric devices employing photocells is thus greatly facilitated inasmuch as the photocell and the necessary correction filter are mounted simultaneously in one step without the handling and positioning of several small components. Furthermore, the optical problems involved with prior art filter elements, for example, interfacing and stack-up error, and the need for polishing the filter surfaces are effectively eliminated.

Accordingly, one object of this invention is to provide a polymeric filter element possessing the desirable spectral absorption characteristics of filter glass without the physical deficiencies of prior art glass filters.

Another object of the invention is to provide a photometric device wherein the spectral response of a photocell is corrected by a filter element comprising a plastic resin containing a particulate dispersion of filter glass.

A further object is to provide a spectrally corrected photocell system which comprises a photocell embedded in a plastic resin containing a particulate dispersion of filter glass sufficient to attenuate radiant energy incident on said photocell.

A still further object is to provide a method of correcting the spectral response of a photocell by disposing a filter element comprising a plastic resin containing a particulate dispersion of particles of the appropriate filter glass in the optical path before the photocell.

Other objects of the invention will in part be obvious and in part appear hereinafter.

DETAILED DESCRIPTION OF THE PREFERRED EMBODIMENT

Figure 1:
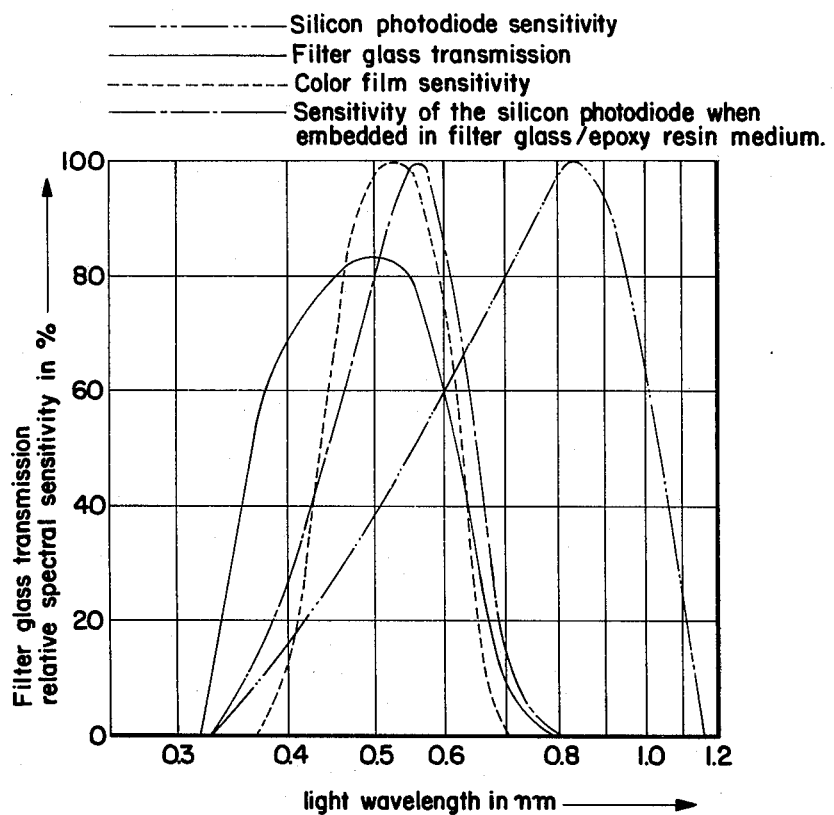
FIG. 1 is a graphic representation of the typical sensitivity curves of a silicon photodiode and photographic color film, the transmission curve of a preferred filter glass and the "corrected" sensitivity curve of the silicon photodiode when embedded in an epoxy resin containing a uniform dispersion of particles of said filter glass in accordance with this invention.

The present invention is generally applicable to a wide variety of processes and products which presently employ glass filter elements to attenuate radiant energy. The filter elements of this invention are readily fabricated employing conventional procedures familiar to those skilled in the art.

In general, it will be apparent that successful practice of this invention will depend in large part on the utilization of known principles in the fabrication of the filter element which are directed to ensuring that the glass and plastic compenents thereof cooperate physically, optically and chemically to provide the desired filtration results. For example, it is understood that the transmittance of the radiant energy through the filter element should be as unimpeded as possible to minimize substantial energy losses due to light scattering, internal reflection and the like. It is, therefore, preferable in the practice of this invention that the plastic resin and the filter glass selected for dispersion therein have substantially the same indices of refraction. Since the index of refraction will vary with wavelength, a standard or reference wavelength should be specified at which the indices of refraction should match, for example, the wavelength corresponding to the sodium doublet line ($n_D^{25\ °}$) or about 5890–5896 A.

Furthermore, it will be appreciated that the manner in which the filter glass is physically processed and dispersed in the plastic resin is an important consideration in preserving the above-mentioned unimpeded optical path through the resultant filter element. Adequate precautions should be taken to avoid the introduction of a different refractive index medium at the glass/resin interfaces during the grinding and dispersion processes. Of course, such an introduction would destroy the refractive index match of the glass and resin and thus result in substantial disruption in the transmittance of light through the filter element. As an example, an air-filled void between the surface of a glass particle and the surrounding resin would, because of the lower index of refraction of air in relation to the resin, cause the light to be diverted from the glass particle rather than be transmitted through it, as is required to obtain the desired filtration. Air bubbles in the resin may also seriously weaken the resinous mass structurally. It is, therefore, adviseable to degas the system, for example, by subjecting the liquid resin, liquid addenda, the glass/resin mixture, etc., to a vacuum during the dispersion process in order to avoid the entrainment of air into the mixture. Since the introduction of liquids such as water around the particles would also scatter light passing through the filter element, the filter glass should be ground and dispersed under substantially moisture-free conditions.

A preferred procedure in the above regard comprises treating the glass particles with a compound commonly known as a "silicane" or "silanizing agent" during the fabrication of the filter element. These organo-silicon compounds may be represented by the formula: R—Z—Si—R'$_3$ wherein R is a functional group reactive with the plastic resin, e.g., an epoxy, vinyl or amino group; Z is lower alkylene; and R' is an organic group reactive with the glass, e.g., an ether radical. By reacting at the surface of the glass particle to replace hydroxyl groups with organic radicals which are chemically reactive with the plastic resin, these compounds not only eliminate water from the glass surfaces but also act to bond the plastic resin to the glass, thereby providing an uninterrupted optical path from one medium to the other. The treatment of glass with the silanizing agent may be accomplished at various stages in the process, for example, while the glass is being ground, after the glass is ground but before it is dispersed in the resin, or the agent may actually be included in the resin itself or in addenda solutions such as the curing agent. The amount of silanizing agent employed will vary and preferably corresponds to the amount needed to obtain a monomolecular coverage of the glass surfaces. Amounts typically range from about 0.2% to about 0.5% based on the weight of glass, although greater or lesser amounts are possible.

The filter glass may be ground employing conventional equipment suited for this purpose, such as, for example, a ball-mill. It should be noted, however, that such milling methods employing pestle devices can introduce debris into the glass powder which may subsequently serve as light-scattering contaminants in the resultant filter element and, therefore, cleaner grinding methods such as air jet milling are preferred. The glass is preferably ground to a very small particle size, for example, in a range of from about 1 to 10 microns in diameter, for adequate dispersion and optical performance although a small amount (preferably less than about 5%) of particles over 10 microns may be present. Since the glass particles tend to stick together as larger aggregates, particle size separation is preferably accomplished with, for example, an air stream classifier, although conventional meshing procedures may also be employed.

The filling of the resin with a substantial amount of glass particles in accordance with this invention, for example, an amount equal to from 30% to about 60% by weight, or more, will result in substantial changes in the physical properties of the original resin. Glass per se is a common filler for plastic resins, for example, epoxy resins, and the nature and magnitude of the effects that a given amount of glass filler has on a particular physical property is well understood by those skilled in the polymer art and need not be described in detail herein. For further reference, see the *Encyclopedia of Polymer Science and Technology*, Vol. 5, Interscience Publishers, New York, particularly pages 768 to 781. As previously noted, the present invention is directed to the optical utilization of plastic resins filled with filter glass particles, and thus is readily distinguishable from the aforementioned prior art employment of glass particles to modify the physical properties of a plastic resin.

In a preferred embodiment of this invention, the spectral response of a photocell in an automatic exposure control system of a photographic camera may be "corrected" by a filter element comprising a plastic resin having uniformly dispersed therein particles of a filter glass which has been selected for its desirable spectral absorption properties in relation to matching the spectral response of the photocell to that of the photographic film being exposed.

Automatic exposure control systems have been developed and marketed by the photographic industry as part of a continuing effort to improve and simplify the procedures for effectively operating photographic devices. The systems basically function to evaluate scene brightness or illumination, weigh this evaluation with respect to the sensitometric characteristics of the film being exposed and regulate one or more variable exposure control parameters such as exposure interval or aperture size in correspondence with the weight evaluation. Scene brightness evaluation is performed with light measuring circuits utilizing one or more of the aforementioned photocells. The photocells are aligned in a manner such that they are responsive to the light characteristics of a scene approximately coincident with that of the field of view of the camera lens system.

Photographic devices incorporating automatic exposure controls usually employ light measuring circuits configured to provide for automatic regulation of the exposure interval control parameter, aperture settings being fixed or manually preselected prior to each exposure. Such exposure interval or shutter control is typically accomplished by integrating the output of a light sensitive circuit over an interval determined in accordance with a reference level signal. For instance, one popular timing arrangement utilizes a voltage sensitive trigger circuit for operating the opening and closing blades of a shutter to initiate and terminate an exposure. The circuit includes an R—C network, the resistor component of which is the photocell whose resistance is functionally related to the level of brightness of a scene to which the element is exposed. Activation of the R—C network occurs substantially at the same time the shutter is opened and the arrangement generates a trigger voltage in a period of time dependent upon the capacitance of the network and the resistance of the photocell as established by the level of scene brightness. The voltage sensitive trigger circuit is responsive to the voltage generated by the R—C network such that when the voltage reaches a predetermined trigger voltage, the shutter closing blade is actuated to terminate exposure and thereby define an exposure interval.

Such automatic exposure control systems as described above are well known in the photographic art. For further reference, preferred exposure control systems are described with particularity in a variety of commonly assigned U.S. Patents including, for example, Eloranta U.S. Pat. No. 3,641,889 and Burgarella U.S. Pat. Nos. 3,620,143 and 3,641,891.

It will be appreciated by those skilled in the art that a wide variety of photocell and glass filter systems are suitable for the practice of this invention. For convenience, however, the more specific description of the invention may be limited to a preferred silicon photodiode and relate filter system without limitation of the invention to that specific embodiment.

The preferred silicon photodiodes are characterized as exhibiting such desirable properties as linearity of output signal current with changes in input light power levels, a wide light level detection capability and excellent long term stability, and have recently become quite popular as the basic sensor in industrial and commercial light measuring instrumentation. See, for example, *Optical Spectra*, Vol. 7, Issue 10, pages 33–36 (October 1973).

The typical silicon photodiode is sensitive to radiant energy with wavelengths between about 350 nm and 1200 nm, whereas the sensitivity of typical color photographic film is confined to the visible region of the spectrum, i.e., from about 400 nm to about 700 nm. As will be apparent from FIG. 1, which in part depicts the typical mismatch of sensitivities between the uncorrected silicon photodiode and the photographic color film employed in the camera, a correction filter with peak absorption in the near-infrared region of the spectrum, i.e., from about 700 nm to about 1200 nm, and high transmission in the visual region from about 400 nm to about 700 nm, should be used in association with the silicon photodiode to "correct" its spectral response in relation to the film. The transmission curve of a particularly preferred filter glass with the spectral absorption characteristics necessary to accomplish this correction is also depicted in FIG. 1. For optimum performance, it is desirable that the correction filter selected should absorb sufficient infrared radiation so that less than about 5% of the total photocurrent provided by the photodiode is attributable to infrared radiation.

The above-described mismatch of sensitivities may be corrected in accordance with this invention by disposing an optical filter element comprising a plastic resin including a particulate dispersion of the preferred filter glass in the optical path before the silicon photodiode. The resultant corrected sensitivity curve of the photodiode is depicted in FIG. 1 and it can be readily seen that it now essentially matches that of the photographic film. This matching of sensitivities is particularly useful in cameras employing diffusion transfer photographic processes, or so-called "instant photography," since errors in the exposure of the picture cannot be readily compensated for in the on-site processing of this film as is possible with film processed later in a photographic laboratory.

While preferred filter glass materials for use with a silicon photodiode provide high transmission in the visible region of the spectrum as well as high absorption in the infrared region, some selective absorption in the visible region may also be desirable to more closely match the spectral response of the photocell and the photographic film. This modification of spectral composition in the visible region is somewhat analogous to the well known "color correction" of artificial light sources utilized in photographic sensitometry to duplicate average daylight conditions, and may be a characteristic of the filter glass itself or may be the result of adding organic dyes to the plastic resin in addition to the filter glass.

Several organic dyes are known and employed in the photographic art in connection with the color temperature correction of sensitometric light sources and are contemplated as useful in this aspect of the invention. These dyes are selected mainly for their absorption characteristics in the visible region below 700 nm since few, if any, organic dyes possess the ability to absorb substantial amounts of radiation in the range of the silicon diode's infrared sensitivity where the filter glass material is most effective. Thus, it is contemplated as within the scope of this invention to also disperse or dissolve such organic "color correction" dyes in the resin in combination with the particulate dispersion of filter glass in order to provide the desired correction filtration in the visual region for the photocell. As examples of such color correction dyes, mention may be made of dyes of the anthraquinone type, such as the various substituted amino anthraquinones, and dyes of the phthalocyanine type. A particularly preferred color correction dye is the phthalocyanine dye, Irgacet Brilliant Blue 2-GLN, commercially available from Ciba-Geigy, Ardsley, New York. The use of this dye is convenient in epoxy resin systems employing acid anhydride curing solutions since it is readily soluble therein and thus can be added to the resin in the same solution as the curing agent. The organic dyes employed must, of course, not only meet the specific spectral requirements but should also be light-fast and resistant to the heat associated with modern molding processes as well as exhibit compatability with the resin system employed. It is contemplated that some dyes suitable for the practice of this invention may not meet the spectral requirements mentioned above until they have reacted with the plastic resin.

It should also be noted that a typical silicon photodiode may not exhibit a sensitivity to blue light which is comparable to that of a photographic color film. Since short wavelength photons are absorbed near the surface of the cell and the electron-hole pairs created by the photons tend to recombine before reaching a relatively deep p-n junction, they are not separated at the junction and hence do not contribute to the cell output current. Accordingly, it may be considered desirable for photographic purposes to increase the blue sensitivity of the silicon photodiode employed, for example, by using a shallower p-n junction.

The filter element of the present invention may be disposed in the optical path before the photocell in a variety of ways which will be apparent to those of ordinary skill in the art. The filter element may take the form of a discrete filter element positioned near to or on the face of the photocell; it may be part of another component in the optical path before the photocell; it may be applied as a coating over the face of the photocell, etc. A presently preferred embodiment comprises embedding the photocell in the resin/glass filter element, and this embodiment will be described in detail hereinafter.

Embedding, i.e., the encasement of a part or assembly in a mass of material, commonly a resin, has long been known to those in the electronics art as a useful technique for achieving such desirable results as mechanically stronger electrical assemblies, modular constructions, miniaturization, and environmental resistance, and therefore, the basic principles and procedures involved in this technique are readily available to one practicing the present invention. For example, reference may be made to the extensive discussion under "Embedding" in *Encyclopedia of Polymer Science and Technology*, Vol. 5, Interscience Publishers (John Wiley & Co.), New York, New York, pages 747–800. Although the term "encapsulation" is sometimes also used in the art for this process, generally speaking the terms "embedment" or "embedding" are employed herein to denote the complete encasement of the photocell to some uniform external shape wherein a very high volume of the completed package is made up of the embedment material. However, regardless of terminology, the utilization of resins which can be converted from a liquid to a solid, i.e., "cured," at atmospheric pressures and at room or slightly elevated temperatures is implied.

Although embedding may be accomplished by casting or potting techniques, the use of transfer or injection molding is preferred in the practice of this invention primarily because of the relative economy and increased production rates associated with this method. The transfer molding process is one whereby a dry, solid molding compound is heated in a molding press to the point of compound plasticity, at which time it flows (is transferred) under pressure from a container into a cavity shaped to the dimensions and construction of the desired part. For the purposes of producing an embedded photocell in accordance with the present embodiment of this invention, the process is specifically accomplished by positioning the silicon photodiode "chip" mounted on a wire grid within the cavity so that the molding compound entirely surrounds the photodiode when the heated compound is transferred from its container to the cavity. Portions of the wire are left uncovered to serve as electrical "leads" to the appropriate light-measuring circuitry. The photodiode so embedded in molding compound remains in the heated mold for a few seconds or minutes until the curing process is completed and is then removed. To protect the component from humid environments, it may be subsequently overcoated, e.g., by screen printing, dipping, etc., with a suitable protective coating, for example, a coating of a liquid grade epoxy resin. Alternatively, overmolding with the unfilled plastic resin used for embedment can provide the desired humidity protection. Since the photocell is not unidirectionally light sensitive, this overcoat is preferably rendered light opaque, except for a small window directly over the photocell, to ensure that the photocell is exposed only to the desired incident radiation.

The thickness of glass/resin medium over the photocell, i.e., the depth to which the photocell is embedded, will vary with the filtration desired, and the kind and quantity of the filter glass and resin components employed. In general, a thickness of less than about 100 mils has proven to be sufficient, and preferably in the range from about 30 to 60 mils.

Figure 2:
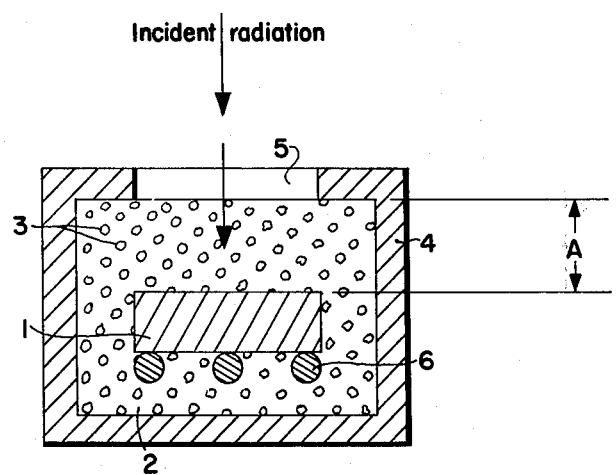
FIG. 2 is a vertical cross-sectional view of an embedded photocell produced in accordance with this invention.

FIG. 2 illustrates a cross-sectional view of a typical photocell system produced in accordance with this invention. The photocell 1 is shown as being embedded in a plastic resin 2 containing a uniform dispersion of filter glass particles 3. The entire package may be covered with a hermetic overcoat 4 which may be rendered light opaque, except for a window 5 positioned over the photocell, in order to minimize superfluous radiation. Electrical connection to the appropriate circuitry may be provided through wire leads 6 which project beyond the resinous mass. Incident radiation thus passes through the window as shown and is spectrally filtered by the filter glass particles before it strikes the photocell to produce the appropriate photocurrent. As just indicated, the thickness of the glass-filled resin, dimension A, is typically less than about 100 mils.

A presently preferred molding compound for the transfer molding of the above-described embedded photocell comprises an epoxy resin containing filter glass particles derived from a glass whose spectral absorption properties provide both the substantial elimination of near-infrared radiation with wavelengths between about 700 nm to about 1200 nm, and selective absorption in the visual region from about 400 nm to about 700 nm for "color correction" purposes.

Although a wide variety of epoxy resins are commercially available for transfer molding processes and may be alternatively employed in the process of this invention, a glycidyl ether type is presently preferred, and more specifically the bisphenol A epoxy commerically available under the designation MC-18 from Hysol, Inc. (Division of Dexter Corporation), Olean, New York, has been found to be particularly suitable. Of course, the curing agent used with the epoxy resin greatly determines its handling properties, as well as its end-product properties in a manner which is well understood by those skilled in the art. In the practice of the present invention, a liquid acid anhydride curing agent has been found to be most advantageous.

The above epoxy resins are excellent because of the ease with which they can be formulated in the "B-stage" or semicured condition. In this stage, the epoxy compound is a solid, dry material which readily becomes fluid under moderate heat and pressure. A typical method for making a "B-stage" epoxy molding compound in accordance with the present invention may begin with the grinding of the filter glass in a substantially moisture-free environment (accomplished, for example, by the aforementioned silicane treatment during crushing) to a particle size of about 1 to 10 microns. Then this filter glass powder may be mixed with other additives such as the curing agent, any organic color correction dyes employed, etc., to form an addenda mixture with a quantity of filter glass equal to from about 30 to about 60% of the total weight of the final epoxy/glass molding compound. The liquid or melted epoxy resin may subsequently be blended with this addenda mixture, heated to initiate curing and poured into trays. The viscous liquid material is then aged in the trays at the elevated temperature until the reaction has progressed to a predetermined point, which may be measured, for example, by a flow test run at a standard pressure. When the desired aging point is reached, the material may be cooled to room temperature and removed from the trays for use in the transfer mold. Alternatively, the formulation may be further processed before molding, for example, by granulating, by blending with other B-stage resins, by compacting into other preforms of a specified size and weight, etc. Since such B-stage molding compounds are hygrosopic and exhibit degraded flow properties and increased cure times upon the absorption of moisture, normal protection against humid environments is recommended.

Various filter glasses have heretofore been employed as photocell correction filters and are contemplated as being suitable for the practice of this aspect of the invention, alone or in combination with other filter materials depending upon the spectral absorption characteristics of the filter glass selected. The shape of the spectral transmittance curve of the filter glass may be varied considerably by the practitioner, as is known in the art, depending on the characteristics of the basic glass itself, the kind and quantity of colorants employed, the relative proportions of the coloring components, the oxidation state of the colorants (when the coloration is caused by colored simple or complex ions in true solution), the conditions of thermal treatment (when coloration is caused by a posterior temperature treatment of the basic glass), and so forth. As examples of filter glass particularly suited for use with the above-mentioned silicon photodiode, mention may be made of the glass commerically available from Jena *er* Glaswerk Schott & Gen., Mainz, W. Germany under the designation BG-18, and glass bearing the designation CM-500 from Hoya Glassworks Ltd., Tokyo, Japan. Mention may also be made of several filter glasses available from Corning Glass Works, Corning, New York, for example, those marketed under the designation numbers 3961; 4602; 4784; and 9782.

The invention will now be further illustrated by the following examples which are intended merely to illustrate the invention and are not to be interpreted as limiting the invention to the details set forth therein.

EXAMPLE I

A control photocell/filter system was fabricated by placing a glass filter chip of Schott-Jena BG-18 glass directly over a silicon photodiode measuring about 87 mm by 70 mm (manufactured by Texas Instruments, Dallas, Texas). Test system A comprised an identical silicon photodiode embedded as described in detail hereinbefore in Hysol No. MC-18 epoxy resin having a 30% by weight loading of BG-18 filter glass particles. Test system B comprised an identical silicon photodiode embedded in the above-named epoxy having a 60% by weight loading of BG-18 filter glass particles.

The photocurrent produced by irradiating each of the above systems with a 50 foot candle, 2850° K extended light source was measured and the results in microamps are tabulated in the column entitled "Total Photocurrent" in Table 1 below. A Wratten No. 87C filter (Eastman Kodak, Rochester, New York) was then placed intermediate the light source and the photodiode/filter system in order to filter out visible radiation before it reached the photocell. The amount of photocurrent produced by the infrared radiation alone was then measured for each of the systems and is tabulated in the column entitled "IR Photocurrent" in Table 1. The thickness dimensions correspond to the thickness of filter material through which the light must pass to reach the photocell of each system.

Table 1

|  | Thickness (mils) | Total Photocurrent (microamps) | IR Photocurrent (microamps) | % of Total Photocurrent which is IR |
|---|---|---|---|---|
| Control (BG-18 glass filter | 21 | 2.00 | 0.05 | 2.5% |
| A(30% BG-18/epoxy) | 35 | 4.50 | 0.70 | 1.5% |
| B (60% BG-18/epoxy) | 40 | 1.58 | 0.02 | 1.3% |

The results tabulated above indicate that the embedded photocell systems A and B of the present invention provide effective correction filtration for the photocell, with IR filtration comparable to that provided by a separate filter element comprising only the filter glass. It can also be seen that increased loadings of filter glass in the plastic resin, for example, an increase from 30 to 60%, results in a substantial attenuation of total radiant energy reaching the photocell, and thus a corresponding reduction in the resultant photocurrent. However, the percentage of that photocurrent which is attributable to IR radiation, a measure of the efficiency of each system's IR filtration is essentially unchanged.

EXAMPLE II

Total photocurrent and IR photocurrent were measured in the same manner as in Example I for test systems C and D, which comprised identical silicon photodiodes to those employed in Example I embedded in Hysol No. M-C18 epoxy resin having a 60% by weight loading of Corning No. 4784 filter glass particles. The thickness of the epoxy/glass medium in front of the photodiode of test system D was about twice that of test system C. The results are summarized in Table 2 below:

Table 2

|  | Thickness (mils) | Total Photocurrent (microamps) | IR Photocurrent (microamps) | % of Total Photocurrent which is IR |
|---|---|---|---|---|
| C (60% No. 4784/epoxy) | 40 | 4.80 | 1.10 | 23% |
| D (60% No. 4784/epoxy) | 70–80 | 2.67 | 0.37 | 14% |

The results shown in Table 2 illustrate that substantial reductions in total photocurrent and IR photocurrent, and increased filtration of infrared radiation (as evidenced by a decrease in the percentage of total photocurrent attributable to IR radiation) may be achieved simply by increasing the thickness of the resin/glass medium in front of the photocell without changing the loading of filter glass particles.

EXAMPLE III

Total photocurrent and IR photocurrent were measured as described in Example I for test system E, which comprised a silicon photodiode identical to that employed in Examples I and II embedded in Hysol No. MC-18 epoxy resin having a 60% loading of Corning No. 9782 filter glass particles. To illustrate that the efficiency of filtration is greatly influenced by the particular filter glass selected to be dispersed in the resin, the results from system B of Example I and system C of Example II are included with the results from system E in Table 3 below. All of these systems had the same loadings of filter glass particles in the resin as well as the same thickness dimensions, and differ only in the filter glass employed.

Table 3

|  | Thickness (mils) | Total Photocurrent (microamps) | IR Photocurrent (microamps) | % of Total Photocurrent which is IR |
|---|---|---|---|---|
| B (60% BG-18/epoxy) | 40 | 1.58 | 0.02 | 1.3% |
| C (60% No. 4784/epoxy) | 40 | 4.80 | 1.10 | 23% |
| E (60% No. 9782/epoxy) | 40 | 1.16 | 0.03 | 2.6% |

While presently preferred embodiments of the invention have been shown and described with particularity, it will be appreciated that various changes and modifications may suggest themselves to those of ordinary skill in the art upon being apprised of the present disclosure. It is intended that all such changes and modifications as fall within the scope and spirit of the appended claims be encompassed.

What is claimed is:

1. A photocell/spectral correction filter system which comprises a photocell embedded in a plastic resin containing a dispersion of finely divided particles of filter glass having a refractive index closely matching that of said plastic resin in an amount sufficient to modify the spectral composition of radiant energy incident on said photocell so as to conform to a predetermined standard, said particles having a diameter from about 1 to about 10 microns.

2. A system as defined in claim 1 wherein said photocell is a silicon photodiode, said filter glass absorbing infrared radiation and transmitting visual radiation.

3. A system as defined in claim 1 wherein the thickness of said filter glass-containing resin in the optical path before said photocell is less than about 100 mils.

4. A system as defined in claim 1 wherein said plastic resin is an epoxy resin having a refractive index which matches the refractive index of said filter glass to within ± 0.015 units at a wavelength of about 5890–5896 A.

5. A system as defined in claim 1 wherein the amount of said filter glass in said plastic resin is from about 30 to about 60% by weight.

6. A system as defined in claim 1 wherein said plastic resin further includes an organic color-correction dye.

7. A photomeric device comprising:
   a photocell;
   light-measuring circuit means electrically associated with said photocell; and
   an optical filter element disposed in the optical path before said photocell, said filter element comprising a plastic resin containing a dispersion of finely divided particles of filter glass having a refractive index closely matching that of said plastic resin in an amount sufficient to modify the spectral composition of radiant energy incident on said photocell so as to conform to a predetermined standard, said particles having a diameter of from about 1 to about 10 microns.

8. A photometric device as defined in claim 7 wherein said photocell is embedded in said filter element.

9. An automatic exposure control system for a photographic camera comprising:
   a silicon photodiode embedded in an epoxy resin containing a uniform dispersion of from about 30% to about 60% by weight of filter glass particles having a diameter of from about 1 to 10 microns;
   said epoxy resin having a refractive index which matches the refractive index of said filter glass to within ± 0.015 units at a wavelength of about 5890–5896 A;
   said filter glass absorbing infrared radiation and transmitting visual radiation so as to match the spectral response of said photodiode with the sensitivity of the photographic film being exposed in said camera; and
   light-measuring circuit means electrically associated with said embedded photodiode, said circuit means being configured to provide automatic regulation of an exposure control parameter of said camera in correspondence with illumination modulated photocurrent provided by said embedded photodiode.

10. A method of modifying the radiant energy from a source to a photocell which comprises:

embedding said photocell in a plastic resin containing a dispersion of finely divided particles of filter glass having a refractive index closely matching that of said plastic resin in an amount sufficient to modify the spectral composition of radiant energy incident on said photocell so as to conform to a predetermined standard, said particles having a diameter from about 1 to about 10 microns.

11. A method as defined in claim 10 wherein said filter glass particles are dispersed in said plastic resin in an amount from about 30 to about 60% by weight.

12. A method as defined in claim 10 wherein said plastic resin is an epoxy resin having a refractive index which matches the refractive index of said filter glass to within ± 0.015 units at a wavelength of about 5890–5896 A.

13. A method as defined in claim 12 wherein said epoxy resin is a bisphenol A epoxy cured with an acid anhydride.

* * * * *